United States Patent [19]

Cecchin et al.

[11] Patent Number: 5,302,454
[45] Date of Patent: Apr. 12, 1994

[54] PLASTO-ELASTIC POLYPROPYLENE COMPOSITIONS

[75] Inventors: Giuliano Cecchin; Floriano Guglielmi, both of Ferrara, Italy

[73] Assignee: HIMONT Incorporated, Wilmington, Del.

[21] Appl. No.: 931,127

[22] Filed: Aug. 17, 1992

Related U.S. Application Data

[63] Continuation of Ser. No. 515,936, Apr. 27, 1990, abandoned.

[30] Foreign Application Priority Data

Apr. 28, 1989 [IT]  Italy ............... 20328 A/89

[51] Int. Cl.$^5$ ............... C08L 23/16; C08L 23/12
[52] U.S. Cl. ............... 428/402; 525/240; 525/322; 525/323; 526/909
[58] Field of Search ............... 525/240, 322, 323; 526/909; 428/402

[56] References Cited

U.S. PATENT DOCUMENTS

| | | | |
|---|---|---|---|
| 3,957,919 | 5/1976 | Von Bodungen et al. | 525/211 |
| 3,974,236 | 8/1976 | Koga et al. | 525/323 |
| 4,368,280 | 1/1983 | Yui et al. | 525/240 |
| 4,489,195 | 12/1984 | Saeda et al. | 525/323 |
| 4,547,552 | 10/1985 | Toyota et al. | 525/322 |
| 4,634,735 | 1/1987 | Thiersault et al. | 525/240 |

FOREIGN PATENT DOCUMENTS

| | | |
|---|---|---|
| 0077532 | 4/1983 | European Pat. Off. . |
| 0086300 | 8/1983 | European Pat. Off. . |
| 0145368 | 6/1985 | European Pat. Off. . |
| 0170255 | 2/1986 | European Pat. Off. . |
| 178631 | 4/1986 | European Pat. Off. ............ 525/323 |
| 256724 | 2/1988 | European Pat. Off. . |
| 57-010611 | 1/1982 | Japan ............... 525/323 |
| 57-065740 | 4/1982 | Japan . |
| 1-120834 | 6/1986 | Japan ............... 525/323 |

Primary Examiner—Carman J. Seccuro, Jr.

[57] ABSTRACT

Polypropylene compositions having valued plasto-elastic properties, in the form of spheroidal flowable particles with an average diameter included between 500 and 7000 um having the following composition:

A) 10-60 parts by weight of homopolymer polypropylene with isotactic index greater than 90, or of crystalline propylene copolymer with ethylene and/or an alpha olefin such as butene-1, pentene-1 or 4-methyl-1-pentene, containing over 85% by weight of propylene and having an isotactic index greater than 85;

B) 10-40 parts by weight of a polymer fraction containing ethylene, insoluble in xylene at room temperature;

C) 30-60 parts by weight of an amorphous copolymer ethylene-propylene fraction optionally containing small proportions of a diene, soluble in xylene at room temperature and containing 40-70% by weight of ethylene.

5 Claims, No Drawings

PLASTO-ELASTIC POLYPROPYLENE COMPOSITIONS

This application is a continuation of application Ser. No. 07/515,936, filed Apr. 27, 1990, now abandoned.

This invention refers to thermoplastic polypropylene compositions having elastomeric properties, obtained in the form of spheroidal particles, endowed with specific flowability and apparent density characteristics, and to their preparation method.

During the last few years, polypropylene compositions having elastic properties while maintaining the capability of being transformed into manfuactured articles using the same apparatus and process normally used for thermoplastic materials, have gained more and more importance.

Said compositions, sometimes referred to as polyolefin thermoplastic elastomers, have found application above all in the automotive, electric cables and sporting goods fields. Because of their advantageous performances, they tend to replace the more expensive thermoplastic styrene and butadiene based rubbers.

The compositions are prepared by mixing, under dynamic vulcanization conditions, ethylene-propylene rubbers (EPR), or ethylene-propylene-diene rubbers (EPDM), with crystalline polyolefins, in particular polypropylene.

Such a preparation process involves a considerable use of energy and the mechanical homogeneity of the components is not always such to impart the desired balance of optimum properties to the final product.

Therefore, the need is felt to be able to produce polyolefin compositions with the desired balance of elastoplastic properties through polymerization processes.

A method for the preparation of polymer products having elasto-plastic properties directly in the polymerization phase is described in U.S. Pat. No. 4,298,721.

The thermoplastic elastomers described in such a patent are obtained by polymerizing ethylene-propylene mixtures using specific types of catalysts supported on magnesium halides. The copolymers obtained in this manner have elasto-plastic properties, but are not heat resistant, since they have a relatively low melting point (around 100°–130° C.).

U.S. Pat. No. 4,489,195 describes the preparation of polyolefin thermoplastic elastomers in two stages of polymerization using stereospecific catalysts supported on magnesium halides; in the first stage homopolymer polypropylene is formed, and in the second, carried out preferably in gas phase, an elastomeric ethylene/propylene copolymer.

In order to prevent agglomeration of the particles, the temperature in the second stage is kept relatively low (under 50° C.). The polymer is obtained in powder form.

The need to operate at a relatively low temperature in the rubber copolymer formation stage penalizes the process from the point of view of the thermal exchange as well as the diminished productivity of the catalyst. According to the data furnished in the patent, the composition do not include ethylene polymeric fractions insoluble in xylene at room temperature.

U.S. Pat. No. 4,491,652 describes the preparation of polypropylene thermoplastic elastomers in two stages, where in the first stage the propylene is polymerized to homopolymer polypropylene, and in the second one mixtures of ethylene-propylene are polymerized to form rubbery copolymers. The second stage is carried out in the presence of a solvent at temperatures of 60°–80° C. Operating at this temperature, one obtains partial dissolution of the rubbery copolymer with the formation of lumps which must then disintegrated. According to the patent the disintegration is done by grinding. As a matter of fact, it is known that when the percentage of the rubbery ethylene-propylene copolymer exceeds about 20% of the total polymer, it is impossible to avoid the agglomeration of the particles even when the operation takes place in the presence of stereospecific catalysts (see European published patent application 0029651 and Belgian patent 876,413).

The agglomeration phenomenon is particularly critical when the ethylene-propylene copolymerization stage is done in gas phase. The fouling of the reactors prevents in practice to carry out the process in gas phase.

Now unexpectedly it has been found that using specific catalysts supported on magnesium chloride it is possible to obtain, even with processes in gas phase, polypropylene compositions with plasto-elastic properties, in the form of spheroidal particles having flowability and bulk density characteristics sufficiently elevated and such as to allow the use of same in normal processes of transformation to products without having to resort to preliminary granulation operations.

The compositions, as a result of to their plasto-elastic characteristics, are suitable for all applications foreseen for traditional thermoplastic polyolefin elastomers.

Moreover, since the composition are obtained under conditions where the rubbery phase which is formed is distributed uniformly in the polypropylene matrix, they provide properties superior to the corresponding compositions obtained by mechanical mixing of components.

Finally, since the compositions are obtained with very highly active catalysts, the amount of catalyst residue in said compositions is so small that the removal of catalysts residues is not necessary.

The compositions of the invention include:

A) 10–60 parts by weight, preferably 20–50 parts by weight, of homopolymer polypropylene with isotactic index greater than 90, preferably between 95 and 98, or of a crystalline propylene copolymer with ethylene and/or an alpha olefin $CH_2=CHR$, where R is a 2–6 carbon alkyl radical, containing more than 85% by weight of propylene and having an isotactic index greater than 85;

B) 10–40 parts by weight of a polymeric fraction containing ethylene, insoluble in xylene at room temperature;

C) 30–60 parts by weight, preferably 30–50 parts by weight, of an amorphous ethylene-propylene copolymer fraction, optionally containing small proportions of a diene, soluble in xylene at room temperature and containing 40–70% by weight of ethylene.

The total content of the polymerized ethylene is between 20 and 60% by weight.

The molecular weight of the various fractions (determined by measuring intrinsic viscosity in tetrahydronaphthalene at 135° C.) varies depending on the nature of the components and the melt index of the final product. It is comprised within the following preferred limits:

0.5–3 dl/g for fraction A);

2–8 dl/g for fractions B) plus C).

As already indicated the compositions are obtained in the form of spheroidal particles having an average diameter between 500 and 7000 μm, flowability (at 70° C.) lower than 30 seconds; bulk density (tamped) greater than 0.4 g/cc, in particular between 0.4 and 0.6 g/cc.

The compositions present at least one melting peak determined at DSC at temperatures higher than 140° C.; flex modulus lower than 700 MPa, preferably between 200 and 500 MPa; VICAT softening point greater than 50° C.; Shore A hardness greater than 80 and Shore D hardness greater than 30; tension set at 75% lower than 60%, in particular between 20 and 50%; tensile stress greater than 6 MPa, in particular between 8 and 20 MPa.

The examination of the compositions under electronic microscope indicates that the phase dispersed is constituted by amorphous ethylene-propylene copolymer and has an average particle size smaller than 2 μm.

The manufactured articles that can be obtained from the composition find application particularly in the automotive, electrical cables and sporting goods fields.

The compositions are prepared with a polymerized process including at least two stages, where in the first stage the propylene is polymerized to form component A), and in the following stages the ethylene-propylene mixtures are polymerized to form components B) and C).

The operation takes place in liquid or gas phase, or in liquid-gas phase.

A preferred process consists in carrying out the propylene homopolymerization stage using as a diluent the liquid propylene, and the copolymerization stage of the propylene and ethylene in gas phase without intermediate stages except for the partial degassing of the propylene.

The polymerization of the propylene may be done in the presence of ethylene or an alpha olefin such as butene-1, pentene-1, 4-methylpentene-1, in such quantities that the isotactic index of the resulting product is greater than 85%.

The copolymerization of the propylene and the ethylene can also occur in the presence of another alpha-olefin or a diene, conjugated or not, such as butadiene, 1,4-hexadiene, 1,5-hexadiene, ethylidene-norbornene-1.

The reaction temperature in the propylene polymerization stage and in the propylene and ethylene copolymerization stage may be equal or different, and is comprised generally between 40° C. and 90° C., preferably 50°-80° C. in case of homopolymerization and 50°-70° C. in case of copolymerization.

The pressure of the first stage is the one that competes with vapor pressure of the liquid propylene at the working temperature, possibly modified by the vapor pressure of the small quantity of inert diluent used to feed the catalytic mixture and the hydrogen overpressure as regulator of the molecular weight.

The pressure relative to the copolymerization stage, if done in gas phase, can be between 5 and 30 atm. The stay time relative to the two stages vary depending on the desired rapport between the homopolymer fraction and the bipolymer B and C ones, and are generally between 30 minutes and 8 hours. Known traditional chain transfer agents, such as hydrogen and $ZnEt_2$, can be used as molecular weight regulators.

The catalyst used in the polymerization includes the reaction product of a solid compound containing a titanium compound and an electron-donor compound (internal donor) supported on magnesium chloride, with an Al-trialkyl compound and an electron-donor compound (external donor).

In order to obtain the compositions of the invention in the form of flowable particles, having high bulk density, it is critical that the solid catalyst component presents the following properties:
surface area smaller than 100 m²/g, in particular between 50 and 80 m²/g;
porosity: between 0.25 and 0.4 cc/g;
X-ray spectrum: presence of a halo at angles 2 θ between 33.5° and 35° and no reflections at 2 θ=14.95°.

The catalyst component is prepared following the method described below.

A magnesium chloride adduct with alcohol containing generally 3 moles of alcohol for mole of $MgCl_2$, is obtained in the form of spherical particles by emulsifying the molten adduct in an inert hydrocarbon liquid immiscible with the adduct, and then cooling the emulsion very quickly in order to cause the adduct ot solidify in spherical particle form.

The particles are then submitted to partial dealcoholization with a heating cycle between 50° and 130°C. which brings the alcohol content from 3 to 1–1.5 moles per mole of $MgCl_2$.

The adduct is then suspended in $TiCl_4$ cold, in a concentration of 40–50 g/l and consequently brought to a temperature of 80°–135° C. at which it is maintained for a period of 1–2 hr.

To the $TiCl_4$ is also added an electron-donor compound selected preferably among the alkyl, cycloalkyl or aryl phthalates such as for instance diisobutyl, di-n-butyl and di-n-octyl phthalate.

The excess of $TiCl_4$ is separated hot through filtration or sedimentation, and the treatment with $TiCl_4$ is repeated one or more times; the solid is then washed with heptane or hexane and dried.

The catalyst component thus obtained presents the following characteristics:
surface area: less than 100 m²/g, in particular between 50 and 80 m²/g;
porosity: 0.25–0.4 cc/g;
pores volume distribution such that more than 50% of the pores have a radius greater than 100 A;
X-ray spectrum presenting a halo with maximum intensity between angles of 2 θ of 33.5° and 35°, and where no reflection is present at 2 θ of 14.95°.

The catalyst is obtained by mixing the catalyst component with an Al-trialkyl compound, preferably Al-triethyl and Al-triisobutyl, and an electron-donor compound selected preferably among silane compounds of the formula R'R"Si(OR)₂ where R' and R", equal or different, are alkyl, cycloalkyl or aryl radicals containing 1–18 carbon atoms, and R is a 1–4 carbon alkyl radical.

Typical silanes are diphenyldimethoxysilane, dicyclohexyldimethoxysilane, methyl-tert-butyldimethoxysilane and diisopropyldimethoxysilane.

Silane compounds such as phenyltriethoxysilane can also be used.

The Al/Ti ratio is usually between 10 and 200 and the silane/Al molar ratio between 1/5 and 1/50.

The catalysts may be precontacted with small quantities of olefin (prepolymerization), maintaining the catalyst in suspension in a hydrocarbon solvent and polymerizing at a temperature between room temperature and 60° C., and producing a quantity of polymer from 0.5 to 3 times the weight of the catalyst.

The operation can occur in liquid monomer also, producing in this case a quantity of polymer up to 1000 times the catalyst weight.

The data reported in the examples and text relative to the properties listed below have been determined by using the following methods:

| Properties | Method |
|---|---|
| Fluidity index (M.F.R.L.) | ASTM-D 1238 |
| Ethylene percent by weight | Spectroscopy I.R. |
| Intrinsec viscosity | Determined in tetralene at 135° C. |
| Xylene soluble % wt | (see note preceeding the examples) |
| Flex modulus | ASTM - D 790 |
| Notched IZOD resilience | ASTM - D 256 |
| VICAT (1 kg) softening point | ASTM - D 1525 |
| A/D Shore hardness | ASTM - D 2240 |
| Tension set at 75% | ASTM - D 412 |
| Tensile stress | ASTM - D 638 |
| Surface area | B.E.T. |
| Porosity | B.E.T. |
| Bulk density | DIN - 53194 |
| Flowability | The time it takes 100 g of polymer to flow through a funnel, whose output opening has a diameter of 1.27 cm, and walls inclined at 20° with respect to the vertical. |
| Granulometry | ASTM - D 1921 - 63 |
| Whitening resistance | Determined by submitting to impact disks of the polymer being tested, obtained by pressure-injection, with a ram consisting of a hemispheric punch with a diameter of 12.7 mm and weighing 78 g. Both the minimum height to obtain the whitening (h), and the size of the whitening area at the maximum height allowed by the apparatus (76 cm) are measured. |

The samples to be submitted to the various physico-mechanical tests have been molded directly from the in polymer in the form of spherical particles, previously stabilized with 0.1% by weight of IRGANOX$^R$ 1010 and 0.1% by weight of BHT (2,6-di-tert-butyl-para-cresol), under the following conditions and using a GBF V160 injection press:
temperature of the melt polymer: 190° C.;
mold temperature 60° C.;
injection time 20 seconds;
cooling time 25 seconds.

The percentage by weight of total bipolymer (% Bp=% C+% B) is calculated by determining the weight of the propylene-ethylene mixture fed in the second stage and comparing it to the weight of the final product.

The weight percentages of the three fractions A, B and C, described in the text, are determined in the following manner:

% A = 100 − % Bp

% C = S$_c$ − P.Sp where S$_c$ and Sp are the percentage by weight of the xylene soluble portion of the final product and of the polypropylene fraction A respectively; P is the weight ratio between said fraction and the final product.

% B = 100 − % A = %C.

The percentage by weight of ethylene contained in copolymer fraction C soluble in xylene has been calculated with the following formula:

$$\% \text{ Ethylene in fraction } C = \frac{C_F - C_P \cdot Q}{Y}$$

where
$C_F$ = % wt. ethylene in the soluble in xylene of the final product;
$C_P$ = % wt. ethylene in the soluble in xylene of polypropylene fraction A;
Q = % wt. soluble in xylene of fraction A multiplied by the weight fraction of A compared to the final product and divided by the weight fraction of the soluble in xylene of the final product.
Y = % wt of C multiplied by % wt of total bipolymer, divided by one hundred.

Note

DETERMINATION OF THE PERCENTAGE SOLUBLE IN XYLENE 2.5 g of polymer are dissolved in 250 ml of xylene at 135° C. under agitation. After 20 minutes the solution is left to cool down to 25° C., still agitating, and then left to rest for 30 minutes.

The precipitate is filtered with filter paper; the solution is evaporated in nitrogen current and the residual under vacuum dried at 80° C. until it reaches constant weight. In this manner the percentage by weight of polymer soluble in xylene at room temperature is calculated. The percentage by weight of polymer insoluble in xylene at room temperature is considered as the isotactic index of the polymer. The value thus obtained coincides substantially with the isotactic index determined via extraction with boiling n-heptane, which by definition constitutes the isotactic index of the polypropylene.

EXAMPLES

General Operating Methods

The test have been conducted in a 22 l stainless steel autoclave, with helical magnetic agitator operating at about 90 rpm.

Temperature and pressure are kept constant during reaction unless otherwise indicated.

The gas phase is continuously analyzed with a processing gas-chromatograph.

The operation is a batch operation in two stages: the first stage consists of the homopolymerization of the propylene in liquid monomer, the second one of the copolymerization of ethylene and propylene in gas phase.

A) 1st Stage

In the autoclave are introduced at 20° C. in order: 16 l of liquid propylene and the catalytic complex, constituted by a solid component (about 0.15 g) and a mixture of 75 ml of Al-triethyl (TEAL) at 10% in hexane and an adequate quantity of phenyltriethoxysilane (PES)—(molar ratio Al/PES=10).

The catalytic system is fed with propylene pressure. The temperature is brought to 70° C. in about 10 minutes and kept constant for the entire period of the polymerization. The hydrogen is analyzed continuously in gas phase and fed in order to maintain constant the desired concentration. Whenever ethylene is used as a comonomer, an adequate quantity of this olefin is fed continuously in order to maintain constant the percentage in gas phase.

After the established time, practically all the remaining monomer is eliminated by degassing at 60° C. at atmospheric pressure.

B) 2nd Stage

The homopolymer from the first stage, after having taken a sample for the various analyses, is brought to the established temperature. Subsequently, propylene and ethylene are fed, in order, in the ratio of a quantity desired in order to obtain the set gas phase composition and pressure.

During polymerization the pressure is maintained constant by feeding an ethylene-propylene mixture having the same composition as the desired bipolymer and contained in a cylinder with a thermostat at 90° C.

The duration of the feeding vary according to the reaction of the catalytic system and the quantity of the bipolymer needed to supply the planned relative homo- and bipolymer composition. At the end of the test the powder is discharged, stabilized and oven dried in nitrogen current at 60° C. The catalyst component used is prepared from a $MgCl_2 \cdot 3C_2H_5OH$ adduct obtained in the form of spherical particles, following the method in example 2 of U.S. Pat. No. 4,399,054, but operating at 3,000 rpm instead of 10,000 rpm. The adduct is then dealcoholized by heating at gradually increasing temperature from 50° to 100° C. in nitrogen current until the alcohol content reaches 1.5 moles per mole Of $MgCl_2$.

The partially dealcoholized adduct has a surface area=9.1 m²/g; bulk density=0.564 g/cc.

25 g of said adduct are added to 625 ml of $TiCl_4$ under agitation at 0° C.

It is heated to 100° C. in 1 hr. When the temperature reaches 40° C., diisobutylphthalate is added in molar ratio Mg/diisobutylphthalate=8. It is heated to 100° C. for 2 hours, left to settle and then the liquid is syphoned hot. 550 ml of $TiCl_4$ are introduced and heated at 120° C. for 1 hr. It is left to settle and then the liquid is syphoned hot. The solid is washed 6 times using 200 ml of anhydrous hexane at 60° C., and then 3 times at room temperature. The solid, after having been under vacuum dried, presents the following characteristics: porosity=0.261 cc/g; surface area=66.5 m²/g; bulk density=0.440 g/cc.

All the tests carried out and the relative operating conditions are reported on Tables 1A and 1B.

In examples 2 and 4 was used, as external donor, diphenyldimethoxysilane instead of phenyltriethoxysilane.

TABLE 1A

| Examples | | 1 | 2 | 3 | 4 |
|---|---|---|---|---|---|
| 1st PHASE | | | | | |
| Pressure | Ate | 36.4 | 30.4 | 35.6 | 31.2 |
| Time | min. | 90 | 60 | 30 | 60 |
| H₂ in gas phase | % moles | 14.1 | 0.6 | 11.9 | 1.7 |
| C₂ in gas phase | % moles | — | — | — | 1.55 |
| Insotactic index | % wt. | 94.6 | 95.8 | 95.2 | 94.7 |
| Intrinsic viscosity | dl/g | 0.68 | 1.98 | 0.96 | 1.36 |
| Ethylene | % wt. | — | — | — | 2.6 |
| Ethylene in portion | % wt. | — | — | — | 12.1 |

TABLE 1A-continued

| Examples | | 1 | 2 | 3 | 4 |
|---|---|---|---|---|---|
| soluble in xylene | | | | | |
| 2nd PHASE | | | | | |
| Temperature | °C. | 60.0 | 70 | 60 | 70 |
| Pressure | Ate | 12.0 | 11.3 | 11.3 | 11.3 |
| Time | min. | 215 | 350 | 370 | 405 |
| H₂ in gas phase | % moles | 0.4 | 1.0 | 2.05 | 1.1 |
| C₂ in gas phase | % moles | 29.1 | 35.2 | 51.1 | 33.9 |
| C2/C3 in feeding mixture | wt/wt | 45/55 | 55/45 | 70/30 | 51/49 |

TABLE 1B

| Examples | | 1 | 2 | 3 | 4 |
|---|---|---|---|---|---|
| FINAL PRODUCT | | | | | |
| Yield | Kg pol./gTi | 851 | 1230 | 933 | 1380 |
| Bipolymer (Bp) | % wt | 56.3 | 76.4 | 78.2 | 57.4 |
| Ethylene | % wt | 30.1 | 41.5 | 55.1 | 29.3 |
| Intrinsic viscosity | dl/g | 1.89 | 2.38 | 2.44 | 1.95 |
| Fluidity index | g/10' | 18.0 | 1.25 | 2.7 | 4.0 |
| Xylene soluble portion (S_c) | % wt | 42.5 | 42.7 | 44.2 | 36.5 |
| Fraction B | % wt | 16.2 | 34.8 | 38.0 | 21.8 |
| Fraction C | % wt | 40.1 | 41.6 | 40.2 | 35.6 |
| C2 in xylene soluble portion (C_f) | % wt | 42.5 | 52.1 | 58.8 | 44.8 |
| C2 in fraction C | % wt | 45.0 | 53.3 | 67.5 | 47.1 |
| Melt point (DSC) | °C. | 163 | 163.5 | 163 | 148 |
| Flex modulus | MPa | 350 | 320 | 270 | 300 |
| Notched IZOD resilience (c.i.) −40 | J/m | N.B. | N.B. | 950 | N.B. |
| Whitening resistance (height) | cm | >76 | >76 | >76 | >76 |
| Whitening resistance (area) | cm² | 0 | 0 | 0 | 0 |
| Vicat (1·Kg) | °C. | 84 | 86 | 73 | 97 |
| SHORE A hardness | | 97 | 94 | 91 | 95 |
| SHORE D hardness | | 45 | 42 | 36 | 46 |
| Tension set at 75% | % | 48 | 40 | 37 | 40 |
| Tensile stress (tract.) | MPa | 8.1 | 12.1 | 11.7 | 15.6 |
| Tamped bulk density | Kg/l | 0.47 | 0.46 | 0.48 | 0.47 |
| Flowability at 70° C. | sec. | 11 | 11 | 12 | 14 |
| Granule average | um | 1400 | 2000 | 1400 | 2000 |

TABLE 1B-continued

| Examples | 1 | 2 | 3 | 4 |
| --- | --- | --- | --- | --- |
| diam. | | | | |

N.B. = "not broken"

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention and described and claimed.

We claim:

1. A polypropylene composition, in the form of spheroidal flowable particles, obtained by sequential polymerization in at least two steps wherein components (B) and (C) are polymerized in the presence of component (A) polymerized in the first step, comprising;

(A) 10–60 parts by weight of homopolymer polypropylene with isotactic index greater than 90, or of crystalline propylene copolymer with ethylene, with a $CH_2=CHR$ olefin where R is a 2–6 carbon alkyl radical, or combinations thereof, containing over 85% by weight of propylene and having an isotactic index greater than 85;

(B) 10–40 parts by weight of a crystalline, polymer fraction containing ethylene and propylene, having an ethylene content of from about 52.4% to about 74.6% and insoluble in xylene at room temperature;

(C) 30–60 parts by weight of an amorphous ethylene-propylene copolymer fraction containing optionally small proportions of a diene, soluble in xylene at room temperature and containing 40 to 70% by weight ethylene;

said composition having a flex modulus smaller than 700 MPa, tension set at 75% less than 60%, tensile stress greater than 6 Mpa and notched Izod resilience at −20° and −40° C. greater than 600 J/m.

2. The composition of claim 1 where the total content of polymerized ethylene is between 20 and 60% by weight.

3. The compositions of claim 1 or 2 where the flex modulus is between 200 and 500 MPa, the tension set between 20 and 50%, and the tensile stress between 8 and 20 MPa.

4. The composition of claim 1 in the form of spheroidal particles with average diameter between 500 and 7000 μm, flowability less than 30 seconds and tamped bulk density greater than 0.4 g/cc.

5. A manufactured article obtained from the composition of claim 1.

* * * * *